United States Patent
Baumgartner et al.

(10) Patent No.: US 6,678,417 B1
(45) Date of Patent: Jan. 13, 2004

(54) DICTIONARY BASED VIDEO COMPRESSION

(75) Inventors: Jason Raymond Baumgartner, Austin, TX (US); Nadeem Malik, Austin, TX (US); Steven Leonard Roberts, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/451,951

(22) Filed: Nov. 30, 1999

(51) Int. Cl.[7] .................................................. G06K 9/36
(52) U.S. Cl. ........................ 382/236; 382/103; 348/153
(58) Field of Search ................................. 382/103–107, 382/232–240, 250–253; 348/143–161

(56) References Cited

U.S. PATENT DOCUMENTS

| | | | |
|---|---|---|---|
| 5,428,774 A | * 6/1995 | Takahashi et al. | 345/723 |
| 5,455,561 A | * 10/1995 | Brown | 348/154 |
| 5,485,611 A | * 1/1996 | Astle | 382/236 |
| 5,969,755 A | * 10/1999 | Courtney | 348/143 |

* cited by examiner

*Primary Examiner*—Jingge Wu
(74) *Attorney, Agent, or Firm*—Joseph P. Lally; Mark E McBurney

(57) ABSTRACT

A method and system for transmitting video data are disclosed. The method includes receiving a first video image and comparing the first video image to at least one stock image where each of the stock images is associated with a corresponding index value. If a match between at least a portion of the first video image and one of the at least one stock images is detected, the index value corresponding to the matching stock image is transmitted over a transmission medium. In one embodiment, the method further includes receiving the transmitted index value and generating the corresponding stock image from the index value. The method of may further includes comparing the first video image with a set of stock images. If it is determined that the first image does not match to any of the set of stock images, then a new index value is assigned to the first image and the first image is added to the set of stock images. In one embodiment, the new index value and the corresponding video image are then transmitted to a receiving device. In one embodiment, the method further includes determining whether portions of the video image vary from the matching stock image. If so, the difference data comprising the variation between the video image and the stock image is determined and transmitted over the transmission medium with the index value.

15 Claims, 5 Drawing Sheets

DICTIONARY BASED VIDEO COMPRESSION

BACKGROUND

1. Field of the Present Invention

The present invention generally relates to the field of video systems and more particularly to a method and system for reducing video data transmission bandwidth and storage requirements.

2. History of Related Art

The bandwidth and storage requirements for transmitting and archiving video data are extremely large relative to many other types of data such as, for example, text. Various compression schemes such as MPEG are widely used to reduce the transmission bandwidth and storage requirements of video data. While MPEG and similar compression schemes are often effective in substantially reducing the amount of data, the bandwidth required to transmit the compressed data in real time still exceeds the available bandwidth in many applications. Internet video streams and video channels, for example, typically have a data transmission capacity of just a few kilobytes per second, which is grossly insufficient for any useful level of detail.

For many real time applications, data compression by itself is insufficient to enable a professional quality video image such as, for example, television to be transmitted within the constraints of a given transmission system. There are, however, video applications that are color and frame rate limited. In a surveillance application, as an example, much of the video data is typically both repetitive and of little interest. Such a system may be characterized by a repeating sequence of video images in which little or no new information is conveyed. Conventional video transmission systems, unfortunately, are required whether or not the image is substantially identical to a previously recorded image. Take, for example, a video surveillance system that includes four cameras in four locations of a building. Each camera is mounted in a fixed position. A monitor system displays a sequence of the images recorded by each of the four cameras. If the cameras are monitored during a time when little activity is occurring the images recorded by each of the cameras may vary little with time. Nevertheless, a conventional video system is reminded to transmit the entire video image to the display system each time an image is recorded. Transmission of the entire video image can consume a significant portion of the system's transmission bandwidth. As the frame rate of the system is increased to accommodate, for example, an increased number of cameras, the transmission bandwidth may eventually constrain the ability of the system to display the video images in real time. It would therefore be desirable to implement a video system adapted to capitalize on the repetitive data characteristic of certain video applications to reduce the transmission bandwidth by the system.

SUMMARY OF THE INVENTION

The problem identified above are in large part addressed by a method and system for transmitting video data. The method includes receiving a first video image and comparing the first video image to at least one stock image where each of the stock images is associated with a corresponding index value. If a match between at least a portion of the first video image and one of the at least one stock images is detected, the index value corresponding to the matching stock image is transmitted over a transmission medium in lieu of transmitting the video image itself. In one embodiment, the method further includes receiving the transmitted index value and generating the corresponding stock image from the index value. If it is determined that the first image does not match to any of the set of stock images, then a new index value is assigned to the first image and the first image is added to the set of stock images. In one embodiment, the new index value and the corresponding video image are then transmitted to a receiving device. In one embodiment, the method further includes determining whether portions of the video image vary from a matching stock image. If so, the "difference" data comprising the variation between the video image and the stock image is transmitted over the transmission medium along with the index value.

The invention further contemplates a video system including a first video camera configured to record a first video image, a first local processor, a remote processor, and a display device. The first local processor is configured to receive the first video image from the first video camera and is adapted to store the first video image as a first stock image in a first local dictionary and to associate a first index with the first stock image. The remote processor is coupled to the first local processor via a transmission medium and is adapted to create a remote dictionary including the contents of the first local dictionary. The first local processor is operable to transmit the first index in lieu of the first stock image upon receiving a video image matching the first stock image. In one embodiment, the first index value is an integer value indicative of the position of the first stock image in the dictionary. The remote processor may be operable to generate the digital representation of the first stock image for display on the display device in response to receiving the first index. In one embodiment, the system further includes a second video camera configured to record a second video image and a second local processor configured to receive the second video image and to store the second video image as a second stock image in a second local dictionary. The first local dictionary and the second local dictionary may comprise first and second portions of a shared local dictionary. One embodiment of the invention contemplates that the first video camera is configured to move or pan to receive a second video image and to store the second image as a second stock image in the first local dictionary. In one embodiment, the first local processor, upon receiving a video image comprising a first portion that matches to a portion of the first stock image and a second portion comprising difference data indicative of variation between the received image and the first stock image, is operable to transmit the first index and the difference video data to the remote processor, which is configured to generate a display image from the difference data and the first index. The first local processor may include compression software adapted to transmit a compressed version of the difference data. The first local processor may be configured to transmit the first video image and the associated index value to the remote processor the first time the local processor receives the first video image.

BRIEF DESCRIPTION OF THE DRAWINGS

Other objects and advantages of the invention will become apparent upon reading the following detailed description and upon reference to the accompanying drawings in which.

Figure 1:
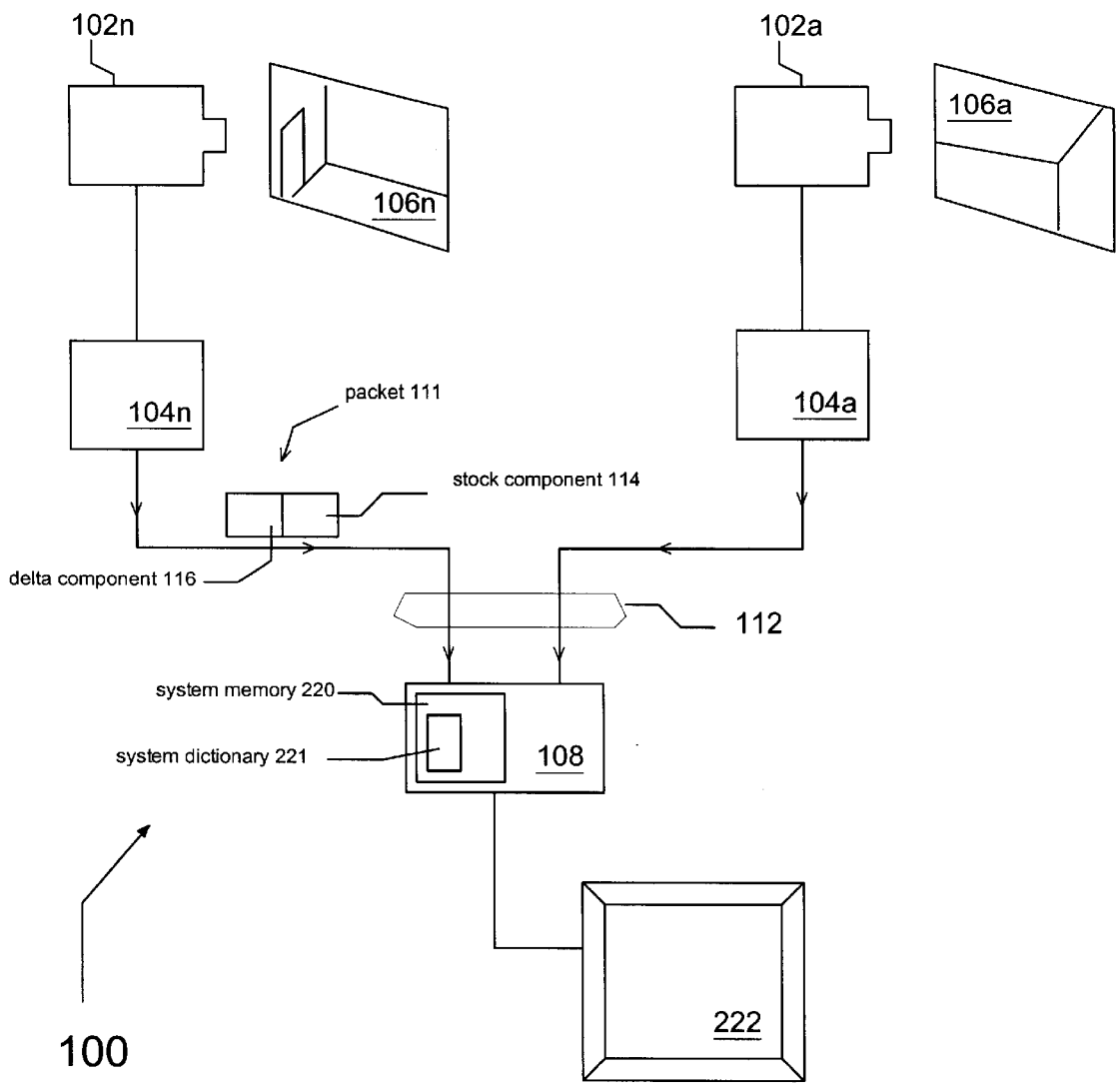
FIG. 1 is a diagram of selected components of a video system suitable for use in one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 depicts selected elements of a video system 100 according to one embodiment of the present invention. In the depicted embodiment, video system 100 includes a set of video cameras 102a through 102n (generically or collectively referred to herein as video camera(s) 102). Each camera 102 periodically captures a one or more video images that are transmitted to a local processing system 104. In the depicted embodiment, each video camera 102 is associated with a corresponding local processing system 104. In another embodiment, video cameras 102 may share one or more local processing systems 104.

Figure 2:
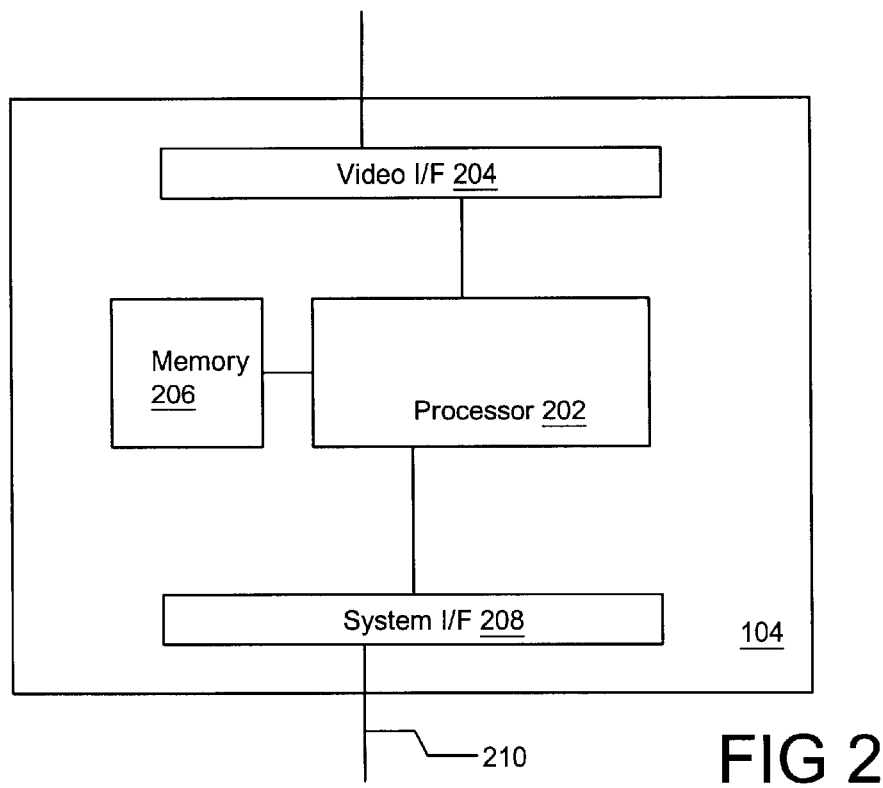
FIG. 2 is a block diagram of selected elements of a local processing system according to one embodiment of the invention.

Turning momentarily to FIG. 2, a simplified block diagram of a local processing system 104 (local processor 104) suitable for use in video system 100 is presented. Local processor 104 preferably includes a general purpose microprocessor 202 that receives video images from one or more video cameras 102 via a video interface unit 204. In one embodiment, video camera 102 is a digital camera that presents a digital video image to interface unit 204. In this embodiment, the interface unit 204 is primarily responsible for formatting the digital data received from video camera 102 to a format suitable for interpretation by microprocessor 202. In another embodiment, video camera 102 provides an analog video image to local processor 104. In this embodiment, the interface unit 204 may include an analog-to-digital converter, a digital signal processor, and other suitable components for converting the video signal received from video camera(s) 102 to a format suitable for use with microprocessor 202. Local processor 104 and a corresponding video camera 102 may be integrated within a single unit or may comprise separate components.

Figure 3:
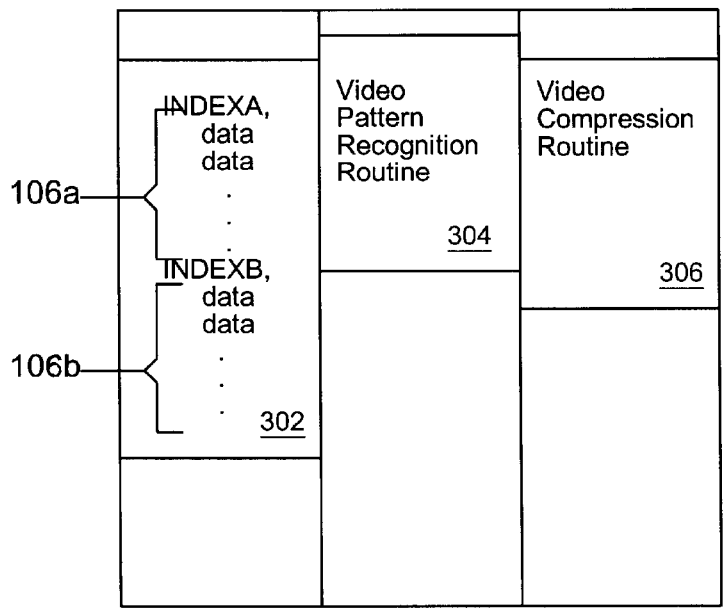
FIG. 3 illustrates selected portions of a memory of the local processing system of FIG. 2.
Figure 4A:
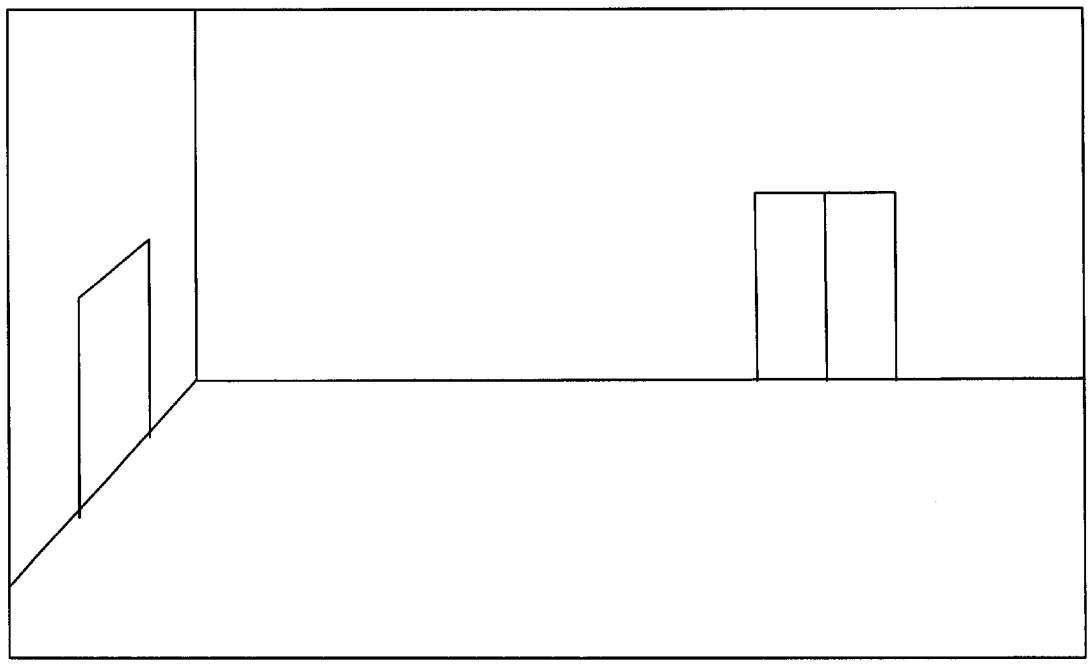
FIG. 4A depicts a stock video image.
Figure 4B:
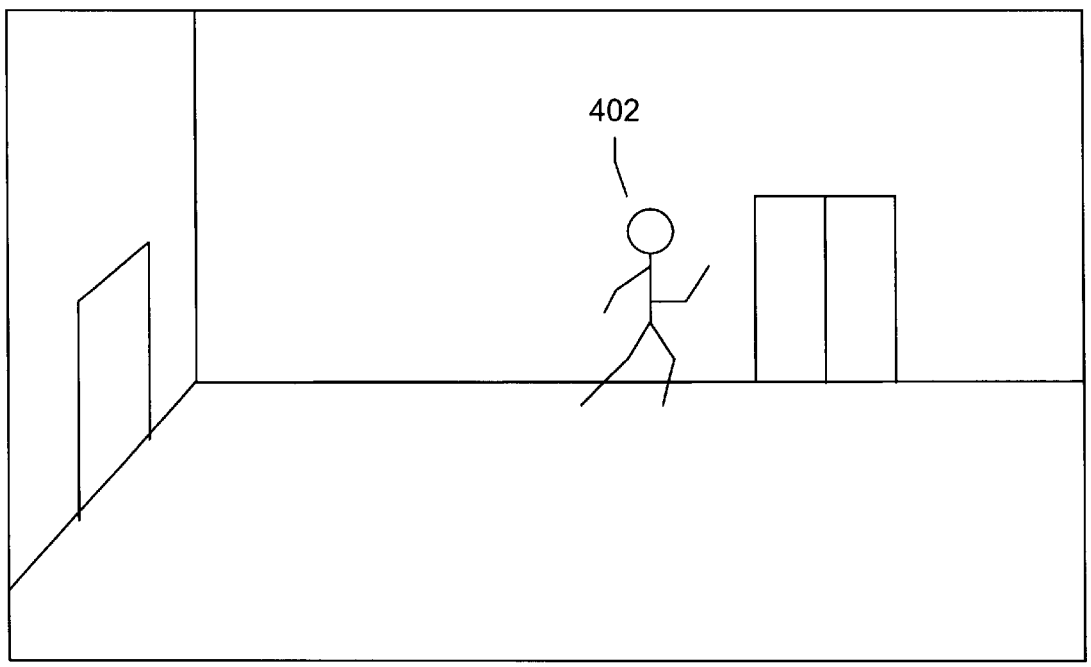
FIG. 4B depicts a video image primarily comprising the stock video image of FIG. 4A, but further including additional detail.

In one embodiment, each local processor 104 includes sufficient memory 206 to store a digital representation of one or more video images. Turning to FIG. 3, a representative depiction of a typical memory 206 configured for use with the present invention is presented. Memory 206, according to the embodiment depicted in FIG. 3, includes a local dictionary, indicated by reference numeral 302, that contains digital representations of one or more video images. In one embodiment, each video image in local dictionary 302 is a "stock" video image that video camera 102 encounters on a recurring basis. In one embodiment, for example, a first video camera 102a is constantly directed at a fixed location, such as a point of entry to a residential or commercial building, as might be the case in a surveillance application. The recurring portions of the first video image recorded by camera 102a are referred to herein as the first stock image 106a. Turning to FIGS. 4A and 4B, a representative stock video image 106 is depicted to illustrate a characteristic of video applications such as surveillance in which much of the video data is repetitive of previous data and much of the repetitive data is of little interest to the system user. In FIG. 4A, a first stock image 106a consists the scene recorded by first video camera 102a when no activity of interest is occurring. Typically, stock images 106 are largely static and unvarying. In the scene of FIG. 4B, camera 102 records much of the same data (i.e., video image) that the camera recorded previously, but in addition, records some new information represented in FIG. 4B by the object 402 in the form of a person. For many applications, it is the "difference data" represented by the object 402 that is of primary interest. Moreover, the object 402 that represents the difference between the image of FIG. 4B and the stock image 106 of FIG. 4A typically comprises a relatively small portion of the data necessary to represent the video image of FIG. 4B. In other words, the video image of the scene in FIG. 4B is primarily comprised of the stock image 106 of FIG. 4A.

The present invention contemplates taking advantage of repeatedly encountered video images in certain video applications to minimize transmission bandwidth and storage requirements for a video system. To accomplish this goal, memory 206 of local processor 104, according to one embodiment, contains pattern recognition software 304 that is suitable for distinguishing features of a video image that are in common with the features of a stock image 106 from features of the image that vary from the stock image 106. In one embodiment, local processor 104 is initialized or "trained" by recording a video image when nothing of interest is occurring in the scene recorded by video camera 102. The video image is then stored in local dictionary 302 of local memory 206 as a stock image 106. In addition, an index value indicative of the location of the stock image 106 within dictionary 302 is associated with stock image 106. Each time the corresponding video camera 102 is sampled, the pattern recognition software 304 is invoked: The pattern recognition software 304 attempts to match the recorded video image with its closest stock image 106. If a match is detected between the video image and one of the stock images 106 in dictionary 302, the index value associated with the matching stock image 106 is retrieved. In one embodiment, the software 304 may further determine the differences, if any, between the recorded image and the matching stock image 106. Local processor 104 then transmits a packet 111 representative of the recorded video image to a remote system processor 108 via a transmission medium 112. To minimize bandwidth consumption of transmission medium 112, the packet 111 may include two components, a stock component 114 representative of the portions of a video image that are in common with a stock image 106 and a delta component 116 representative of the portions of a video image that vary from the stock image 106.

In the preferred embodiment, the stock component 114 of packet 111 that is transmitted between local processor 104 and system processor 108 is merely the index value that is associated with the stock image 106 that matched the video image recorded by video camera 102. System processor 108, in one embodiment, includes a system memory 220 that contains a system dictionary 221 containing each stock image 106 in the set of local dictionaries 302. This system dictionary 221 serves as look-up table that associates a stock component 114 received from a local processor 104 with a corresponding stock image 106. When system processor 108 receives a packet 111 from a local processor 104, the system processor 108 uses the stock component 114 to index the system dictionary 221 stored in system memory 220. Because the number of stock images 106 is likely to be relatively small in surveillance and other similar applications, the index value (i.e., stock component 114) need only contain a few bytes of information that will consume a negligible portion of the system's transmission bandwidth. In one embodiment, for example, each index may comprise a 32-bit, 64-bit, or other suitably sized integer value. System processor 108 can then recreate the video image recorded by video camera 102 for display on a display device 222 by combining the delta component 116 of packet 111 with the stock image 106 that is retrieved from system dictionary 221 based on the value of stock component 114. If a local processor 104 determines that a particular video image recorded by video camera 102 does not match to any stock component 106 in its local dictionary 302, local processor 104 may transmit a stock component 114 with a value indicating that no match to a stock image was found and thereafter sending the entire video image as a delta component 116. Upon receiving a packet 111 with a no-match stock component 114, the remote processor may then store the video image as a new stock image in system dictionary 221. In one embodiment, "perspective" information may be transmitted with each video image to local processor 104 to further facilitate the process of comparing each new video image against the set of stock images 106. The perspective information may include, for example, a camera identification value for a system comprising a set of fixed-position video cameras. In an embodiment in which the local video camera(s) are permitted to pan or rotate between a set of fixed rotation angles, the perspective information may indicate the rotation angle as well as the camera identification. In one embodiment, the perspective information is incorporated as a field in the index value associated with each stock image. When a video image is received, local processor 104 can use the perspective information to narrow the set of stock images against which the video image must be compared. The stock images 106 in dictionary 302 that do not have matching perspective information are not compared against the video image. The ability to narrow the set of stock images 106 against which a received video image must be compared beneficially improves performance. The perspective information may then be included as part of the stock component 114 that is sent to remote processor 108 to improve the efficiency of the video image recreation process by the remote processor.

The system dictionary 221 in system memory 220 of stock images 106 may be constructed by transmitting the stock images 106 to system processor 108 during a learning sequence that is executed prior to initiating operation of system 100. The system user may specify the set of stock images to be captured by each video camera 102. System 100 can then build the system dictionary 221 and a set of local dictionaries 302. In another embodiment, local dictionaries 302 and system dictionary 222 can build stock images 106 as encountered during system operation. In this embodiment, a new stock image 106 is incorporated into the local and system dictionaries 302 and 221 when a local processor 104 fails to find a match between a received video image and the stock images 106 in its local dictionary 302.

Thus, upon receiving a video image for the first time, local processor 104 will add the image to local dictionary 302 as a new stock image, associate the new stock image with a new index value, and transmit a packet 111 with the new stock image as the delta component 116 and the new index value as the stock component 114 to system processor 108 for inclusion in system dictionary 221. Each local processor 104 and system processor 108 may further include compression/decompression software that is used to compress the delta component 116 of each packet 111 prior to transmission to system processor 108 and for expanding the data prior to display on display device 222. In this embodiment, existing compression algorithms such as MPEG are combined with the use of stock image dictionaries as disclosed herein to further reduce the bandwidth and storage requirements for video system 100.

Figure 5A:
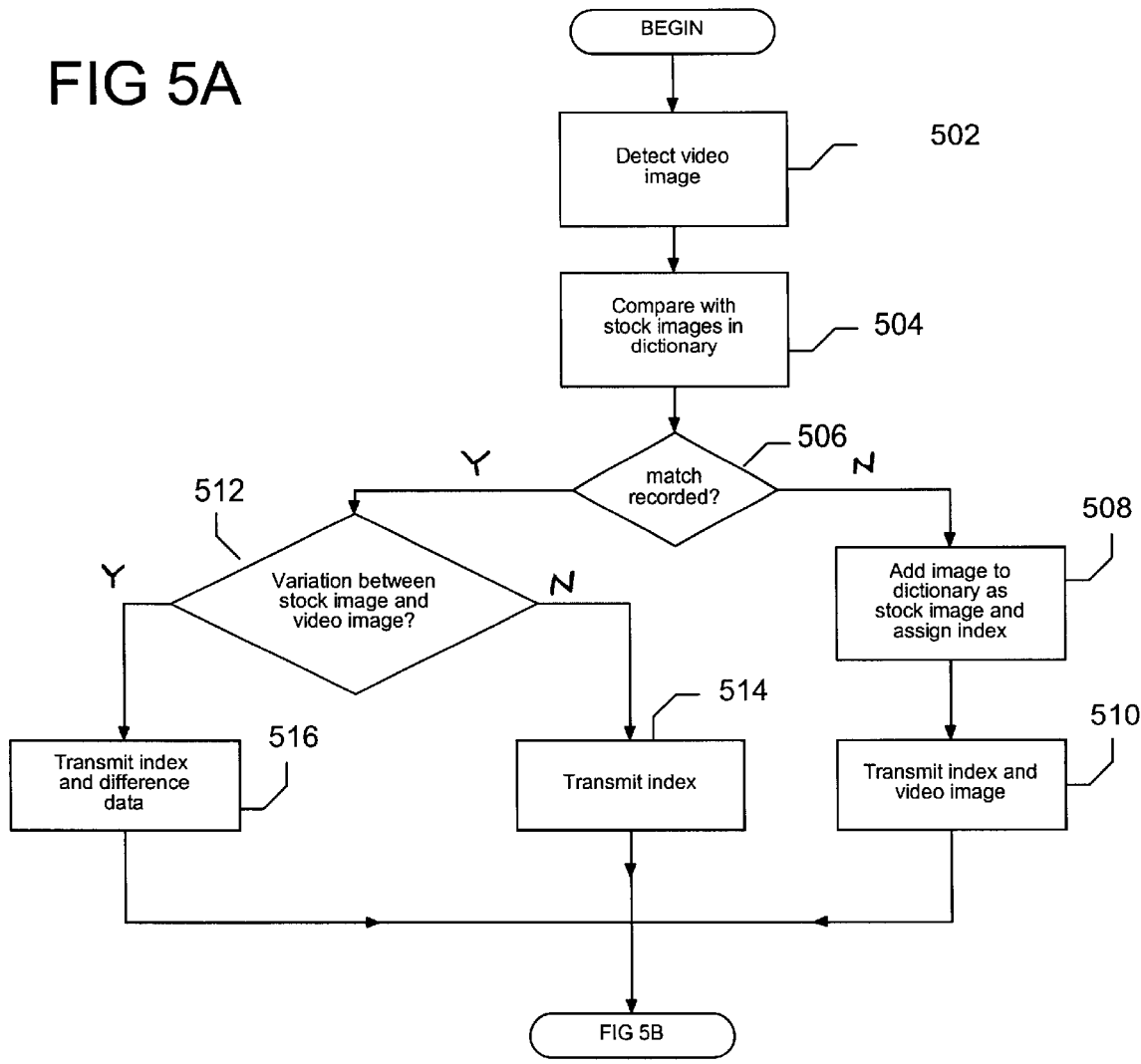
FIGS. 5A and 5B are a flow diagram of a method for transmitting and receiving video data according to one embodiment of the invention.
Figure 5B:
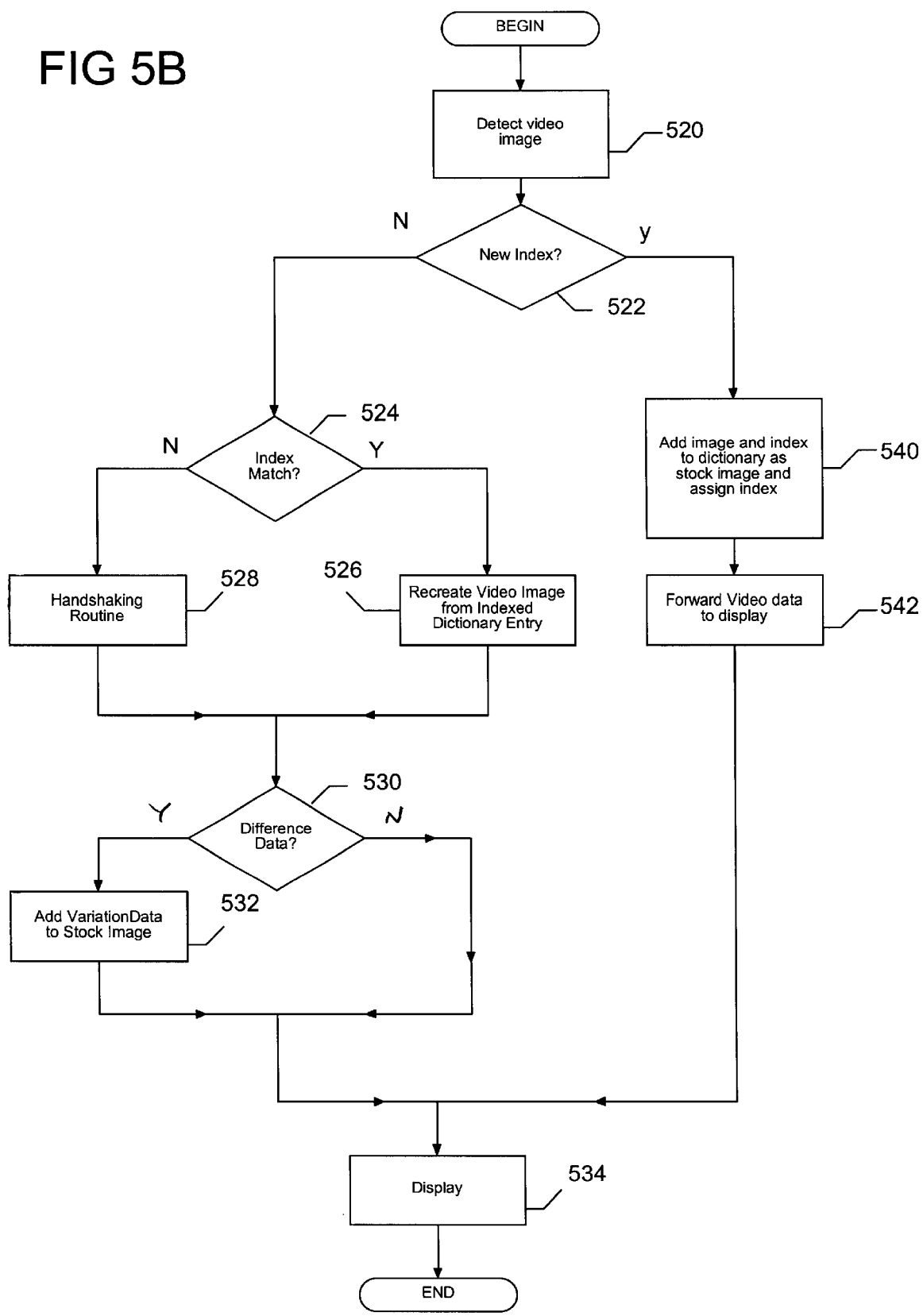

Turning now to FIG. 5, a flow diagram of a method 500 for transmitting video data is presented. Initially, a transmitting device, such as local processor 104 detects a video image in step 502. The detected video image is then compared (step 504) with previously encountered images (the stock images 106) that are stored in a dictionary of the transmitting device (i.e., the local dictionary 302). Suitable pattern recognition software may be used to accomplish the comparison between the detected image and the stock images 106. If the comparison in step 504 determines that the detected image is sufficiently similar to a stock image 106 stored in the dictionary 302, a match is recorded in a step 506. If the detected video image does not match to a stock image, the detected image is added to the local dictionary as a new stock image with an associated new index value in step 508. Thereafter, the new stock image and the new index value are transmitted to a receiving device such as system processor 108 in step 510 as a packet 111. If a match is found in step 506, any differences between the detected video image and the matching stock image 106 are then determined in step 512. If no differences between the recorded image and the matching stock image are found, the corresponding index is transmitted (step 514) as the stock component 114 of a packet 111 in which the delta component 116 contains no data. If differences are detected in step 512, the difference data is transmitted (step 516) over the transmission medium as the delta component 116 along with the matching index value as the stock component 114. Turning to FIG. 5B, the receiving device detects an incoming packet in step 520. The receiving device determines whether the stock component 114 of the packet represents a new index value in step 522. (In one embodiment, the stock component 114 may include one or more bits to indicate whether the index is a new index). If the received index was transmitted on at least one previous occasion from the transmitting device (i.e., if the received index is not a new index), the receiving device determines whether the index matches with any indices in the receiving device's dictionary (i.e., system dictionary 221) in step 524. If an index match is detected, the stock image in system dictionary 221 corresponding to the index is recreated. If the index does not match to any indices in the system dictionary 221, it is presumed that the incoming index includes one or more bits that have changed during transmission. When index data is altered during transmission, one embodiment of the invention contemplates the receiving device initiating a hand shaking routine with the transmitting device in which the receiving device informs the transmitting device of the index error. The hand shaking routine will terminate when the transmitting device retransmits the appropriate index information and the index information is received and recognized by the receiving device. After the stock image associated with a received index is retrieved in step 526, the receiving device determines (step 530) whether the packet includes a delta component 516 with any difference data. If the received information includes difference data, the receiving device adds (step 532) the difference data to the stock image recreated in step 526 and forwards the assembled image data for display in step 534. If, in step 522, it is determined that index represents a new index, the new index and the corresponding delta component 116 (which comprises a new stock image 106), are added to the receiving device's dictionary in step 540. After adding the new index and the corresponding stock image to the system dictionary in step 540, the stock image is forwarded (step 542) to the display device for display in step 534. In one embodiment, the transmission of video data in step 516 and step 510 may include compressing the video data into a compressed format prior to transmission. In this embodiment, the receiving device will un-compress the received video data in steps 542 and 532.

In one embodiment a new index and delta component 116 of the packet 111 are indicated by including "no match" information in a packet 111 to inform the receiving device that the packet contains a new index value and a new stock image to facilitate the determination in step 522. In this embodiment, therefore, each stock component 114 will include information indicating that the received packet contains a new stock image for storing in system dictionary 221. In one embodiment, the dictionaries of the transmitting and receiving devices are permitted to grow larger or smaller dynamically by including a code consisting of a few bits in the stock component 114 of each packet 111 that may be utilized to indicate that an image should be added or deleted. Another variation includes incorporating a "last image" code bit and maintaining "last image" information at both the transmitting device and receiving device. This code bit could then indicate whether a given transmission refers to the stock image for that perspective or the last image at that perspective. This scheme beneficially provides a mechanism for reducing bandwidth in a situation where the delta information being transmitted from a particular perspective contains delta information that is recurring. If, for example, an object was placed in view of a particular perspective, the object would represent delta video information each time the video image was compared to the stock image for that perspective. If, on the other hand, the recorded video image were compared to the last image taken at that perspective, the new object would represent delta video information only the first time it was encountered.

Thus, it will be apparent to those skilled in the art having the benefit of this disclosure that the invention contemplates minimizing the bandwidth consumed in a video transmission system by utilizing a mechanism in which static portions of the video images consume essentially no transmission bandwidth. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of transmitting video data, comprising:
   receiving a first video image;
   comparing the first video image to at least one stock image, wherein each of the at least one stock images is associated with a corresponding index value;
   determining whether the video images varies from the matching stock image; and
   transmitting the digital information corresponding to the variance together with the video image.

2. The method of claim 1, further comprising receiving the transmitted index value and, responsive thereto, generating the corresponding stock image from the index value.

3. The method of claim 1, further comprising:
   comparing the first video image with a set of stock images; and
   responsive to determining that the first video image does not match to any of the set of stock images, assigning a new index value to the video image and adding the video image to the set of stock images.

4. The method of claim 3, further comprising, transmitting the new index value and the corresponding video image to a receiving device.

5. The method of claim 1, wherein the index value is an integer and wherein transmitting the index value is further characterized as transmitting the corresponding integer.

6. The method of claim 1, wherein the first video image is associated with perspective information, and wherein the comparing of the first video image to the at least one stock image includes comparing the first video image with only those stock images in the set of stock images with matching perspective information.

7. A local processing system for use in a video system, comprising:
   a local processor configured to receive a video image from a first video camera the video system;
   a local memory coupled to the local processor, wherein the local memory includes a first local dictionary containing at least one stock image, wherein each stock images is associated with a corresponding index; and
   wherein the local memory further includes a set of instructions executable by the local processor comprising means for comparing the received video image to the set of stock images and, upon detecting a match between the received image and one of the set of stock images, transmitting the index corresponding to the matched image to receiver and means, responsive to detecting a match between the received video image and at least a portion of the stock image, for determining variation between the received image and the stock image and for transmitting difference video data representative of the variation between the received image and the stock image in addition to transmitting the index value to the receiver.

8. The local processing system of claim 7, wherein the set of instructions is further configured with means for adding the received video image to the local dictionary as a new stock image and assigning the stock image and index value upon failing to match the received image with the existing set of stock images.

9. The local processing system of claim 8, wherein the set of instructions is further configured to transmit the new stock image and the corresponding index value to the receiver.

10. The local processing system of claim 7, wherein the set of instruction further includes means for compressing the received video image and storing the compressed image as the stock image.

11. The local processing system of claim 7, wherein the index value is an integer and wherein the means for transmitting the index characterized as means for transmitting an integer.

12. A local processing system for use in a video system, comprising:

a local processor configured to receive a video image from a first video camera the video system;

a local memory coupled to the local processor, wherein the local memory includes a first local dictionary containing at least one stock image, wherein each stock image is associated with a corresponding integer value index; and wherein the local memory further includes a set of instructions executable by the local processor comprising means for comparing the received video image to the set stock images and, upon detecting a match between the received image and one of the set of stock images, transmitting the integer value index corresponding to the matching stock image to a receiver as substitute for transmitting the matching stock image itself.

13. The local processing system of claim 12, wherein the set of instructions is further configured with means for adding the received video image to the local dictionary as a new stock image and assigning the stock image a new integer value index value upon failing to match the receiver image with the existing set of stock images.

14. The local processing system of claim 13, wherein the set of instructions is further configured to transmit the new stock image and the integer value corresponding to the new index value to the receiver.

15. The local processing system of claim 12, wherein the set of instruction further includes means for comprising the received video image and storing the compressed image as the image.

* * * * *

UNITED STATES PATENT AND TRADEMARK OFFICE
CERTIFICATE OF CORRECTION

PATENT NO. : 6,678,417 B1
DATED : January 13, 2004
INVENTOR(S) : Jason Raymond Baumgartner, Nadeem Malik and Steven Leonard Roberts It is certified that error appears in the above-identified patent and that said Letters Patent is hereby corrected as shown below:

Column 7,
Line 61, Claim 1 should read:
1. A method of transmitting video data, comprising:

receiving a first video image;

comparing the first video image to at least one stock image, wherein each of the at lest one stock images is associated with a corresponding index value;

responsive to detecting a match between at least a portion of the first video image and one of the at least one stock images, transmitting the index value corresponding to the matching stock image over a transmission medium;

determining whether the video image varies from the matching stock image; and transmitting the digital information corresponding to the variance together with the video image.

Column 8,
Line 48, Claim 8 should read:
8. The local processing system of claim 7, wherein the set of instructions is further configured with means for adding the received video image to the local dictionary as a new stock image and assigning the stock image and index value upon failing to match the received image with the existing set of stock images.
Line 62, Claim 11 should read:
11. The local processing system of claim 17, wherein the index value is an integer and wherein the means for transmitting the index are further characterized as means for transmitting an integer.
Line 66, Claim 8 should read:
12. A local processing system for use in a video system, comprising:

a local processor configured to receive a video image from a first video camera the video system;

a local memory coupled to the processor, wherein the local memory includes a first local dictionary containing at least one stock image, wherein each stock image is associated with a corresponding integer value index; and

UNITED STATES PATENT AND TRADEMARK OFFICE
CERTIFICATE OF CORRECTION

PATENT NO.    : 6,678,417 B1
DATED         : January 13, 2004
INVENTOR(S)   : Jason Raymond Baumgartner, Nadeem Malik and Steven Leonard Roberts It is certified that error appears in the above-identified patent and that said Letters Patent is hereby corrected as shown below:

Column 8 (cont'd),
      wherein the local memory further includes a set of instructions executable by the local processor comprising means for comparing the received video image to the set of stock images and, upon detecting a match between the received image and one of the set of stock images, transmitting the integer value index corresponding to the matching stock image to a receiver as a substitute for transmitting the matching stock image itself.

Column 10,
Line 1, Claim 13 should read;
13. The local processing system of claim 12, wherein the set of instructions is further configured with means for adding the received video image to the local dictionary as a new stock image and assigning the stock image a new integer value index upon failing to match the received image with the existing set of stock images.
Line 11, Claim 15 should read:
15. The local processing system of claim 12, wherein the set of instruction further includes means for compressing the received video image and storing the compressed image as the stock image.

Signed and Sealed this

Seventh Day of September, 2004

JON W. DUDAS
*Director of the United States Patent and Trademark Office*